UNITED STATES PATENT OFFICE.

HORACE L. WELLS, OF NEW HAVEN, CONNECTICUT, ASSIGNOR OF TWO-THIRDS TO MARY H. KING, OF EAST ORANGE, NEW JERSEY.

PROCESS OF EXTRACTING NICKEL.

1,044,316.  Specification of Letters Patent.  Patented Nov. 12, 1912.

No Drawing. Application filed November 11, 1909. Serial No. 527,472.

*To all whom it may concern:*

Be it known that I, HORACE L. WELLS, a citizen of the United States, residing at New Haven, in the county of New Haven and State of Connecticut, have invented a new and useful Improvement in Methods or Processes of Extracting Nickel; and I do hereby declare the following to be a full, clear, and exact description of the same.

My invention relates to a new and useful method for separating and extracting nickel from a matte consisting largely of nickel and copper sulfids, or a combination of these metals with other metals, as for instance, gold, silver, and the platinum group of metals, iron and cobalt.

The object of my invention is to produce an efficient and comparatively inexpensive process for directly extracting, i. e., without roasting or first reducing to metallic form, the nickel from the matte containing the metals or a combination of the metals above specified usually contained in the metalliferous bodies commonly called Bessemer matte or nickel-copper matte or nickel matte.

In carrying out or practising my process I pulverize the matte to a fineness of 60 (sixty) mesh or finer, treat the comminuted material with hydrochloric acid diluted to contain eighteen to twenty-five (18% to 25%) per cent. actual acid and preferably at a temperature between 212° F. and 110° F.

I have found by practice that a matte analyzing about 38% nickel; 42% copper; 20% sulfur, when treated with the required amount of acid heated to about 180° F. and agitated, removes or extracts the major portion of the nickel contained in the matte but it does not extract the whole of the nickel contained therein however long continued the application of the acid may be.

I have found that the solution first obtained must be separated by filtration or decantation or both and the residual matte again subjected to like acid treatment in order to remove the remaining nickel contained in the matte. During the treatment with acid as herein specified the materials must be agitated for the purpose of permitting the acid to act upon every particle of the matte under treatment.

During the treatment of the matte with hydrochloric acid, sulfureted hydrogen gas is evolved and any iron or cobalt is dissolved. A small percentage of the copper goes into solution. The nickel in solution with the iron, cobalt and copper may be separated therefrom by any of the usual processes.

The acid used for the second treatment of matte has only become partially satisfied possessing the power of further dissolving fresh matte and can be used for this purpose.

I claim:—

1. The herein described process for extracting or recovering nickel which consists in pulverizing the matte containing the nickel, treating the same with hydrochloric acid heated to a temperature ranging from 110° F. to 212° F. the material being agitated during such treatment; separating the solution from the residue in any usual way and again treating the residual matte with hydrochloric acid as herein specified.

2. The herein described method of treating a matte containing nickel sulfid which consists in subjecting the matte to a plurality of treatments with hydrochloric acid heated to a temperature ranging from between 110° F. to 212° F. the solution obtained being separated from the residue in any usual manner.

3. The herein described method of extracting nickel directly, i. e., without roasting or reducing to metallic form, from a matte containing the same which consists in finely pulverizing the matte, treating the same with heated hydrochloric acid diluted to contain from 18% to 25% actual acid the material being agitated during such treatment; separating the solution from the residue in any usual way and again subjecting the residual matte to hydrochloric acid as herein specified.

In testimony whereof, I have signed this specification in the presence of two subscribing witnesses.

HORACE L. WELLS.

Witnesses:
 FREDERIC C. EARLE,
 CLARA L. WEED.